G. CORMACK.
TRACTOR.
APPLICATION FILED JUNE 14, 1917.
1,259,962.
Patented Mar. 19, 1918.
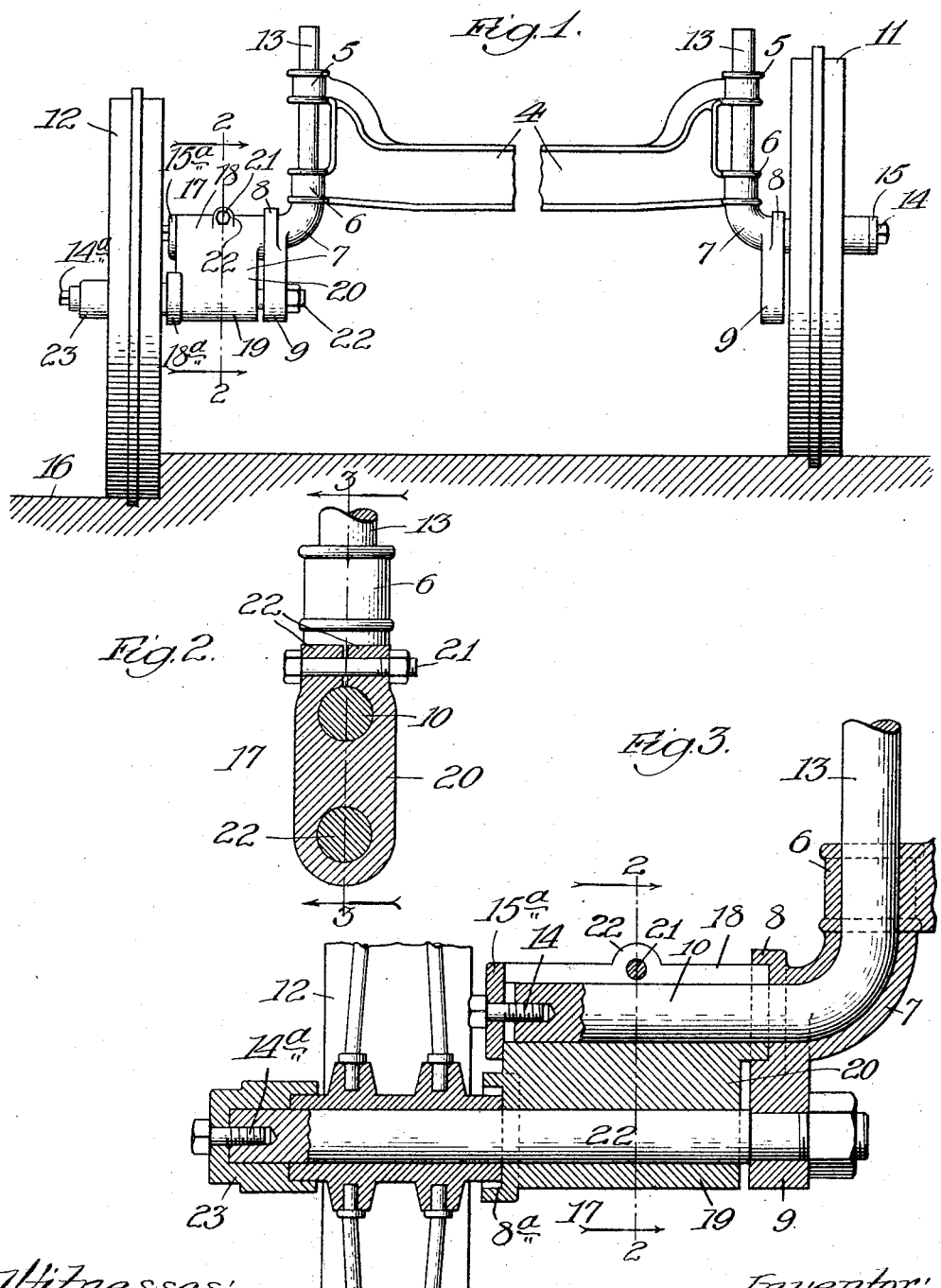
Witnesses:
Inventor:
George Cormack,

UNITED STATES PATENT OFFICE.

GEORGE CORMACK, OF BATAVIA, ILLINOIS, ASSIGNOR TO APPLETON MANUFACTURING CO., OF BATAVIA, ILLINOIS, A CORPORATION OF ILLINOIS.

TRACTOR.

1,259,962.      Specification of Letters Patent.      Patented Mar. 19, 1918.

Application filed June 14, 1917. Serial No. 174,723.

*To all whom it may concern:*

Be it known that I, GEORGE CORMACK, a citizen of the United States, residing at Batavia, in the county of Kane and State of Illinois, have invented a new and useful Improvement in Tractors, of which the following is a specification.

The primary object of my invention is to provide simple means for enabling a front or steering wheel on a tractor agricultural machine to be readily converted into a dead-furrow wheel by extending it laterally outward and lowering it to ride on the bottom of a furrow while the remaining rear and front wheels remain in their relatively normal positions for traveling on the ground surface to carry the machine in horizontal or substantially horizontal position.

In the accompanying drawing, Figure 1 is a broken view in front elevation of the steering wheels of a tractor showing my invention operatively applied in its preferred form of embodiment; Fig. 2 is a section taken on line 2—2, Fig. 1, and enlarged, or on line 2—2, Fig. 3, and Fig. 3 is a section on line 3—3, Fig. 2.

For illustrating my improvement, I have elected to show it in connection with a known form of front steering-axle 4, bifurcated at each end where it is formed with vertically alining collars 5 and 6, the latter having an outwardly curved lower tubular extension 7. For my purpose, hereinafter explained, the extension 7 terminates in a socket 8 and is formed with a perforate depending bearing 9. The axle 10 for each of the two front or steering wheels 11 and 12 is afforded by the horizontally extending section of a bar 13 bent to a right angle, the bend being curved to conform to and fit in the curved extension 7 and the vertical section of the bar passing through the collars 6 and 5, between which the bar is commonly surrounded and resiliently supported by a helical spring (not shown). Each wheel 11 and 12 is normally journaled on an axle 10 and is secured in place by a bolt 14 screwed centrally into the axle-end through a washer 15 of the same diameter as the outer hub-end of the wheel, as represented of the wheel 11 in Fig. 1; the inner hub-end fitting in the socket 8.

To adapt one of the steering wheels, as the wheel 12, to ride on the bottom of a dead-furrow 16, I provide my improved removable and replaceable converting device or attachment 17. This is in the form of two integral parallel sleeves 18 and 19 with or without an interposed web 20 of any desired width for the purpose hereinafter explained; and the sleeve 18 is split longitudinally along its top to adapt it to be tightened in place by a bolt 21 passed through ears 22 provided centrally on the edges of the split.

To convert the wheel 12 into a dead-furrow wheel, it is removed from its axle 10, to which the sleeve 18 is then applied with its inner end entering the socket 8, whereupon it is tightened about the axle and the bolt 14 is inserted into the end of the latter through a washer 15$^a$ of the diameter of the sleeve. This rigidly secures the attachment 17 in place with the sleeve below the plane of the two axles 10. A supplemental axle 22 is then inserted through the support or sleeve 19 and bearing 9, at which it is fastened by a nut on the projecting threaded end of the supplemental axle, on the opposite end of which the wheel 12 is thereupon mounted, with the inner end of its hub entering a socket 8$^a$ formed on the adjacent end of the lower sleeve; and a cap 23 is then fitted upon the outer projecting end of the axle 22 and about the adjacent end of the wheel-hub and fastened by a screw-bolt 14$^a$ passed centrally through the cap into the axle-end.

With my improved attachment adjusted as described, it supports the wheel in offset relation to normal alinement with its companion rear or driving wheel, and lowers it to the extent of the depth of the furrow for riding on the bottom thereof; and it incidentally adapts the dead-furrow wheel to act as a guide in the travel of the tractor. Where the diameter of the two sleeves is sufficient, without any interposed web 20, to lower the dead-furrow wheel to the bottom of the furrow 16, the attachment 17 used may be devoid of the web; but for deeper furrows the attachment used contains a web of adequate width to enable the wheel to ride on the bottom of the furrow. The yielding support of the bars 13 enables the steering wheels to ride the tractor in substantially horizontal position over more or less uneven surfaces; and with the wheel 12 traversing a dead-furrow, the tractor will not be tilted materially, if at all, and the drive-wheels are kept out of furrows and pull on the same character of soil or with the same kind of traction, thereby affording the advantage of giving increased power.

I realize that considerable variation is possible in the details of construction thus specifically shown and described, and I do not intend by illustrating a single specific embodiment of my invention to be limited thereto, my intention being in the following claims to claim protection upon all the novelty there may be in my invention as fully as the state of the art will permit.

I claim:

1. A device for offsetting and lowering the front-steering-wheel of a tractor, comprising a pair of parallel rigidly united sleeves, one sleeve being longitudinally split and provided with means for rigidly securing it about the normal axle of said wheel, and the other sleeve forming a support for a supplemental axle for said wheel.

2. In a tractor, the combination with a front steering-axle, of a steering-wheel axle supported on said steering axle, a sleeve rigidly secured on said wheel-axle and having a parallel depending axle-support, a supplemental axle in said support, and a steering-wheel on said supplemental axle to be offset and ride on the bottom of a dead furrow.

3. In a tractor, the combination of a front steering-axle having vertically alining end-collars, and a curved extension below the lower collar terminating in a socket and having a bearing depending from the socket, a bent bar having a vertical section extending through said collars, a horizontal section forming the axle of a front steering wheel of the tractor and an intermediate curved section in and conforming to said curved extension, a longitudinally split sleeve extending at one end into said socket, secured at its opposite end to and provided with means for tightening it about said axle, a lower sleeve rigidly united with said first-named sleeve to extend parallel therewith and having a socket at its outer end, and a supplemental axle supported in said lower sleeve and carrying one of the front steering-wheels of the tractor to offset said wheel and ride it on the bottom of a furrow.

GEORGE CORMACK.

Copies of this patent may be obtained for five cents each, by addressing the "Commissioner of Patents, Washington, D. C."